United States Patent [19]
Mukherjee et al.

[11] Patent Number: 5,311,424
[45] Date of Patent: May 10, 1994

[54] METHOD AND SYSTEM FOR PRODUCT CONFIGURATION DEFINITION AND TRACKING

[75] Inventors: Sujan K. Mukherjee, Roswell; James L. Ryan, Smyrna, both of Ga.; James R. Wason, Tuxedo, N.Y.

[73] Assignee: International Business Machines Corporation, Armonk, N.Y.

[21] Appl. No.: 723,286

[22] Filed: Jun. 28, 1991

[51] Int. Cl.⁵ .................... G06F 15/22; G06F 15/46
[52] U.S. Cl. ................................... 364/401; 364/468
[58] Field of Search .................. 364/401, 468, 479

[56] References Cited

U.S. PATENT DOCUMENTS

| | | | |
|---|---|---|---|
| 4,831,582 | 5/1989 | Miller et al. | 364/900 |
| 4,875,162 | 10/1989 | Ferriter et al. | 364/401 |
| 5,099,431 | 3/1993 | Natarajan | 364/401 |
| 5,191,534 | 3/1993 | Orr et al. | 364/401 |
| 5,208,765 | 5/1993 | Turnbull | 364/401 |

OTHER PUBLICATIONS

Friedman & Associates, Inc., "The HFA-ATO System" Deerfield, Ill. 60015; Nov. 1988.
XL/Data Comp. Inc., "Guide to Success for Make-to-Order Companies"; pp. 1-21.
"Self-Describing File Vintage for Hardware System Design Files" by W. C. Stetler, IBM TDB, vol. 32, No. 7, Dec. 1989, pp. 327-332.

*Primary Examiner*—Roy N. Envall, Jr.
*Assistant Examiner*—Xuong Chung
*Attorney, Agent, or Firm*—John J. Timar; Lauren C. Bruzzone

[57] ABSTRACT

A method and system for the definition and tracking of multiple unique product configurations for configuration management in which customer contracted views of the product are defined by applying temporary changes to the base product configuration. A product serial number effectivity is assigned to each unique customer specified product configuration and to the base product configuration in order to maintain multiple time-oriented versions of the product, thus supporting simultaneously both customer-specified and design-specified engineering changes to the base product. A product configuration identifier provides non-redundant data storage for each unique product configuration and can refer to noncontiguous ranges of product serial numbers. The configuration entry identifier in a product configuration table is used to peg detail component requirements to serially numbered products in order to correlate the product configurations as built with the product configuration as designed. A component position identifier provides traceability of temporary changes made to the base product that result from customer contract specifications.

10 Claims, 8 Drawing Sheets

| SAMPLE EFFECTIVITY TYPE CODES ||||
| (2 Characters) ||||
| First Character || Second Character ||
| Code | Meaning | Code | Meaning |
| --- | --- | --- | --- |
| D | Date or other time oriented effectivity, including item serial/batch/lot | T | Date effectivity, Used with first character D only. |
| S | Product serial/batch/lot | S | Serial number |
| P | Customer Project | B | Batch number |
| C | Customer Contract | L | Lot number |
|  |  | N | None of the above, Used with first character P or C only. |

*FIG 3*

Engineering Change Notice - ECA

Product P1 is defined as a generic product consisting of a standard assembly A and optional assemblies B, C and D. A configuration identifier Basel is assigned to P1.

Initially define the bill of material for assembly A to be used in the base product P1 serial numbers 1 through 999. Assembly A has the following components:
        Components E - quantity 2
        Components F - quantity 1

Product Configuration Table

| Configuration Entry Id. | Configuration Id. | Product Id. | Serial Start Number | Serial End Number | Customer Id. | Contract Id. |
|---|---|---|---|---|---|---|
| 10 | Basel | P1 | 001 | 999 | | |

EC Affected Item

| EC Id. | Affected Item Id. | Configuration Id. | Design Sequence Number | Based on Config. | Based on Seq. | Effectivity Type | Product Id. | Serial Start Number |
|---|---|---|---|---|---|---|---|---|
| ECA | A | Basel | 8001 | | | SS | P1 | 001 |

Product Bill of Material

| Product Item Id. | Component Item Id. | Configuration Id. | Insert Sequence | Extract Sequence | Quantity Per Assembly | Sales Feature Code | Planning Code | Component Position Id. |
|---|---|---|---|---|---|---|---|---|
| P1 | A | Basel | 8001 | | 1 | Standard | | 1 |
| P1 | B | Basel | 8001 | | 1 | Optional | | 2 |
| P1 | C | Basel | 8001 | | 1 | Optional | | 3 |
| P1 | D | Basel | 8001 | | 1 | Optional | | 4 |
| A | E | Basel | 8001 | | 2 | | Add | 1 |
| A | F | Basel | 8001 | | 1 | | Add | 2 |

*FIG 4*

Engineering Change Notice - ECB

Modify the bill of material for assembly A as per customer ABC contract ABC-1 specifications for product P1 serial numbers 121 through 125. Base component F is replaced by components Y and Z with quantity of 1 each.

Product Configuration Table

| Configuration Entry Id. | Configuration Id. | Product Id. | Serial Start Number | Serial End Number | Customer Id. | Contract Id. |
|---|---|---|---|---|---|---|
| 10 | Base1 | P1 | 001 | 999 | | |
| 20 | Cust1 | P1 | 121 | 125 | ABC | ABC-1 |

EC Affected Item

| EC Id. | Affected Item Id. | Configuration Id. | Design Sequence Number | Based on Config. | Based on Seq. | Effectivity Type | Product Id. | Serial Start Number |
|---|---|---|---|---|---|---|---|---|
| ECA | A | Base1 | 8001 | | | SS | P1 | 001 |
| ECB | A | Cust1 | 8001 | Base1 | 8001 | CS | P1 | 121 |

Product Bill of Material

| Product Item Id. | Component Item Id. | Configuration Id. | Insert Sequence | Extract Sequence | Quantity Per Assembly | Planning Code | Component Position Id. |
|---|---|---|---|---|---|---|---|
| A | E | Base1 | 8001 | | 2 | Add | 1 |
| A | F | Base1 | 8001 | | 1 | Add | 2 |
| A | F | Cust1 | 8001 | | 1 | Remove | 2 |
| A | Y | Cust1 | 8001 | | 1 | Add | 2 |
| A | Z | Cust1 | 8001 | | 1 | Add | 2 |

12 — Engineering Change Notice - ECC

Modify the bill of material for assembly A for the BASE product P1 serial numbers 131 through 999. Replace base component F by component G, quantity 1.

Product Configuration Table — 25

| Configuration Entry Id. | Configuration Id. | Product Id. | Serial Start Number | Serial End Number | Customer Id. | Contract Id. |
|---|---|---|---|---|---|---|
| 10 | Base1 | P1 | 001 | 999 | | |
| 20 | Cust1 | P1 | 121 | 125 | ABC | ABC-1 |

EC Affected Item — 16

| EC Id. | Affected Item Id. | Configuration Id. | Design Sequence Number | Based on Config. | Based on Seq. | Effectivity Type | Product Id. | Serial Start Number |
|---|---|---|---|---|---|---|---|---|
| ECA | A | Base1 | 8001 | | | SS | P1 | 001 |
| ECC | A | Base1 | 8002 — 704 | | | SS | P1 | 131 |
| ECB | A | Cust1 | 8001 | Base1 | 8001 | CS | P1 | 121 |

Product Bill of Material — 20

| Product Item Id. | Component Item Id. | Configuration Id. | Insert Sequence | Extract Sequence | Quantity Per Assembly | Planning Code | Component Position Id. |
|---|---|---|---|---|---|---|---|
| A | E | Base1 | 8001 | | 2 | Add | 1 |
| A | F | Base1 | 8001 | 8002 | 1 | Add | 2 |
| A | G | Base1 | 8002 | | 1 | Add | 2 |
| A | F | Cust1 | 8001 | 706 708 | 1 | Remove | 2 |
| A | Y | Cust1 | 8001 | | 1 | Add | 2 |
| A | Z | Cust1 | 8001 | | 1 | Add | 2 |

*FIG 7*

12 — Engineering Change Notice - ECD

Repeat order ABC-2 from customer ABC for the existing Cust1 configuration for product P1 serial numbers 145 through 146. By this time the base P1 has changed. So modify the bill of material for assembly A to remove base component G rather than base component F.

Product Configuration Table — 25

| Configuration Entry Id. | Configuration Id. | Product Id. | Serial Start Number | Serial End Number | Customer Id. | Contract Id. |
|---|---|---|---|---|---|---|
| 10 | Base1 | P1 | 001 | 999 | | |
| 20 | Cust1 | P1 | 121 | 125 | ABC | ABC-1 |
| 30 | Cust1 | P1 | 145 | 146 | ABC | ABC-2 |

EC Affected Item — 16

| EC Id. | Affected Item Id. | Configuration Id. | Design Sequence Number | Based on Config. | Based on Seq. | Effectivity Type | Product Id. | Serial Start Number |
|---|---|---|---|---|---|---|---|---|
| ECA | A | Base1 | 8001 | | | SS | P1 | 001 |
| ECC | A | Base1 | 8002 | | | SS | P1 | 131 |
| ECB | A | Cust1 | 8001 | Base1 | 8001 | CS | P1 | 121 |
| ECD | A | Cust1 | 8002 | Base1 | 8002 | CS | P1 | 145 |

Product Bill of Material — 20

| Product Item Id. | Component Item Id. | Configuration Id. | Insert Sequence | Extract Sequence | Quantity Per Assembly | Planning Code | Component Position Id. |
|---|---|---|---|---|---|---|---|
| A | E | Base1 | 8001 | | 2 | Add | 1 |
| A | F | Base1 | 8001 | 8002 | 1 | Add | 2 |
| A | G | Base1 | 8002 | | 1 | Add | 2 |
| A | F | Cust1 | 8001 | 8002 | 1 | Remove | 2 |
| A | Y | Cust1 | 8001 | | 1 | Add | 2 |
| A | Z | Cust1 | 8001 | | 1 | Add | 2 |
| A | G | Cust1 | 8002 | | 1 | Remove | 2 |

*FIG 8*

METHOD AND SYSTEM FOR PRODUCT CONFIGURATION DEFINITION AND TRACKING

DESCRIPTION

Cross-Reference to Related Application

The present application is related to co-pending patent application "Method and System for Version Control of Engineering Changes," Ser. No. 602,600, filed Oct. 24, 1990 and having a common assignee.

Background of the Invention

The present invention relates, in general, to computer-based systems for product configuration management in the manufacture of complex products and, more particularly, to the definition and tracking of product configurations as they are designed by the design engineering function within an enterprise.

Product configuration management involves modifying a standard or base product to meet specific customer requirements. Since different customers have different requirements, the base product design is modified in different ways to meet these diverse requirements. Keeping track of the multiplicity of product configurations as designed and their effects on the base product is a complex task which heretofore has not been fully automated. It is a common practice to track custom configured products by assigning a serial number to each unit of product which is then assigned to a customer contract. This describes a product serial number effectivity for the product configuration. Tracking of product configurations by batch numbers and lot numbers are similar to tracking of product configurations by serial numbers.

The complexity of implementing serial number effectivity arises from the fact that there are different types of engineering changes which affect the product configuration concurrently. These can include changes to the base product and changes ordered by customers. Changes to the base product are permanent changes that improve the base product in some way, such as by reducing cost. The latest changes to the base product are incorporated in all custom built configurations unless specified otherwise. Version control techniques are used to keep track of all changes to the base product.

Changes ordered by customers are considered as temporary changes to the base product that are designed for specific customers. Although changes made to the base product for one customer are not applicable to other customers, all custom-ordered configurations get the latest permanent improvement made to the base product unless a back level base product is specifically requested.

Automatic tracking of product configurations as built has not been the problem that automatic tracking of product configurations as designed has been. As built product configurations have been tracked by pegging parts requirements to customer contracts. In other words, the recording of the actual parts that were used to build a specific product for a specific customer contract constitutes the as built configuration of the product.

Most commercially available software products for tracking engineering changes that modify product configurations were developed based on effective date of the new configuration (i.e., date effectivity). Examples are IBM Corporation's Communications Oriented Production Information and Control System (COPICS) and Manufacturing Accounting and Production Information Control System (MAPICS) family of products. The version control of product configurations by effective date is suitable for tracking improvements or other permanent changes to mass produced standard products, but this technique is unsuitable for tracking custom built product configurations.

Recently, some commercially available software products have been modified to track as built product configurations by serial number (i.e., serial number effectivity). An example is IBM Corporation's COPICS Defense product. These modified software products replace from/to dates with from/to serial numbers and use "pegged requirements" to associate detail component requirements with serially numbered end products. The pegging technique provides an upward traceability from components to assemblies to the end product requirement stated in the master production schedule. However, none of the commercially available products can distinguish between permanent changes made to the base product, and temporary changes made to the base product to satisfy specific customer requirements.

SUMMARY OF THE INVENTION

It is an object of this invention to provide a method and system for maintaining multiple versions of a base product configuration using serial number effectivity.

It is another object of this invention to provide a method and system for maintaining multiple versions of a customer specified product configuration using serial number effectivity.

It is another object of this invention to provide a method and system for correlating the as designed product configuration with the as built product configuration.

It is a further object of this invention to provide a method for the non-redundant data storage of each unique product configuration that allows for noncontiguous ranges of product serial numbers.

It is a still further object of this invention to provide a method for distinguishing between permanent changes to a base product and temporary changes made to satisfy customer requirements.

These and other objects and advantages are accomplished by the present invention in which a product configuration definition process assigns a product configuration identifier to each unique product configuration including the base product and all custom configured products. The configuration identifier serves as a view identifier for concurrent tracking of multiple views of the product configuration as designed. It also serves as a peg for both the material requirements planning and inventory management processes for tracking the product configurations as built. A generic or base product is defined that includes all possible optional features. A unique product is then defined by a specific view of the generic product that includes any appropriate option features and any specially designed components, and that excludes base components that were replaced by the specially designed components. For every unique product configuration, multiple ranges of serial numbers can be assigned.

A better appreciation of these and other advantages and features of the present invention, as well as the manner in which the present invention realizes them, will be gained from the following detailed description and accompanying drawings of the preferred embodiment, and from the claims.

DETAILED DESCRIPTION OF THE PREFERRED EMBODIMENT

Figure 1:
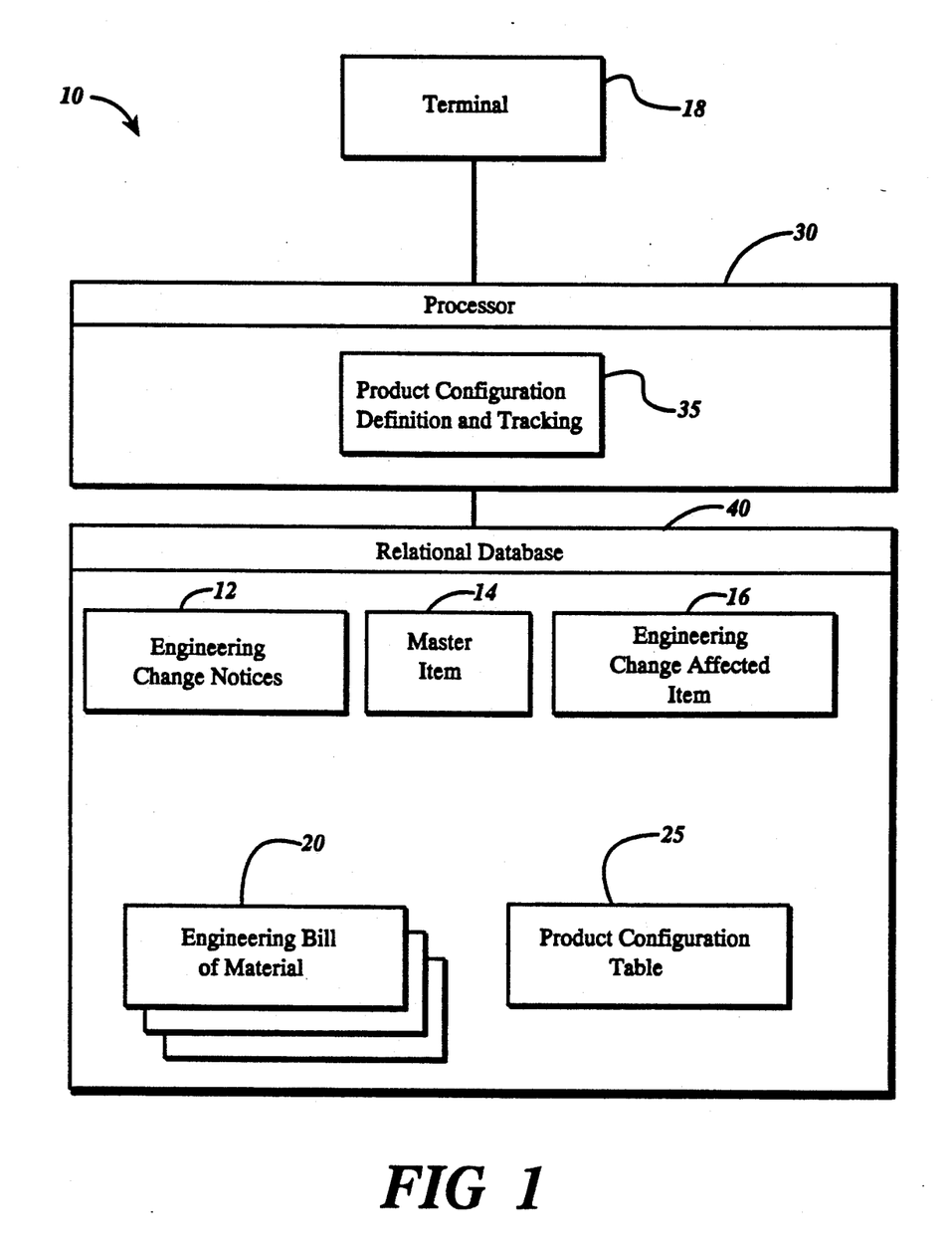
FIG. 1 illustrates a block diagram implementation of this invention which includes the computer system components utilized for product configuration definition and tracking.

A block diagram implementation of the computer system components of the preferred embodiment of the invention is illustrated in FIG. 1. As shown in this figure, the Product Configuration Definition and Tracking system 10 includes a Product Configuration Definition process 35 which operates on computer processor 30. Design engineers and other groups of the users at terminal device 18 interact through processor 30 with relational data base files stored on non-volatile, direct access storage device (DASD) 40 to store and retrieve product configuration information. Permanently stored on DASD 40 are Engineering Change Notices data 12, Master Item data 14, Engineering Change Affected Item data 16, Engineering Bill of Material data 20, and Product Configuration data 25.

Each product is defined as an item of type "product" in Master Item data 14. The assemblies (items) which are used to configure a product are stored as components in Engineering Bill of Material data 20. Engineering Change Notices data 12 authorize creation of each unique product configuration including both the base product configurations and custom built product configurations. The items used in the product configurations are treated as end items. Any modifications to an end item or lower level assembly or component that are generated by an engineering change are recorded in the Engineering Change Affected Item data 16. A product configuration identifier field is stored in Engineering Bill of Material data 20. The product configuration identifier serves to uniquely define each product configuration. Product Configuration data 25 stores the relationship between product configurations and customer contracts.

Figure 2:
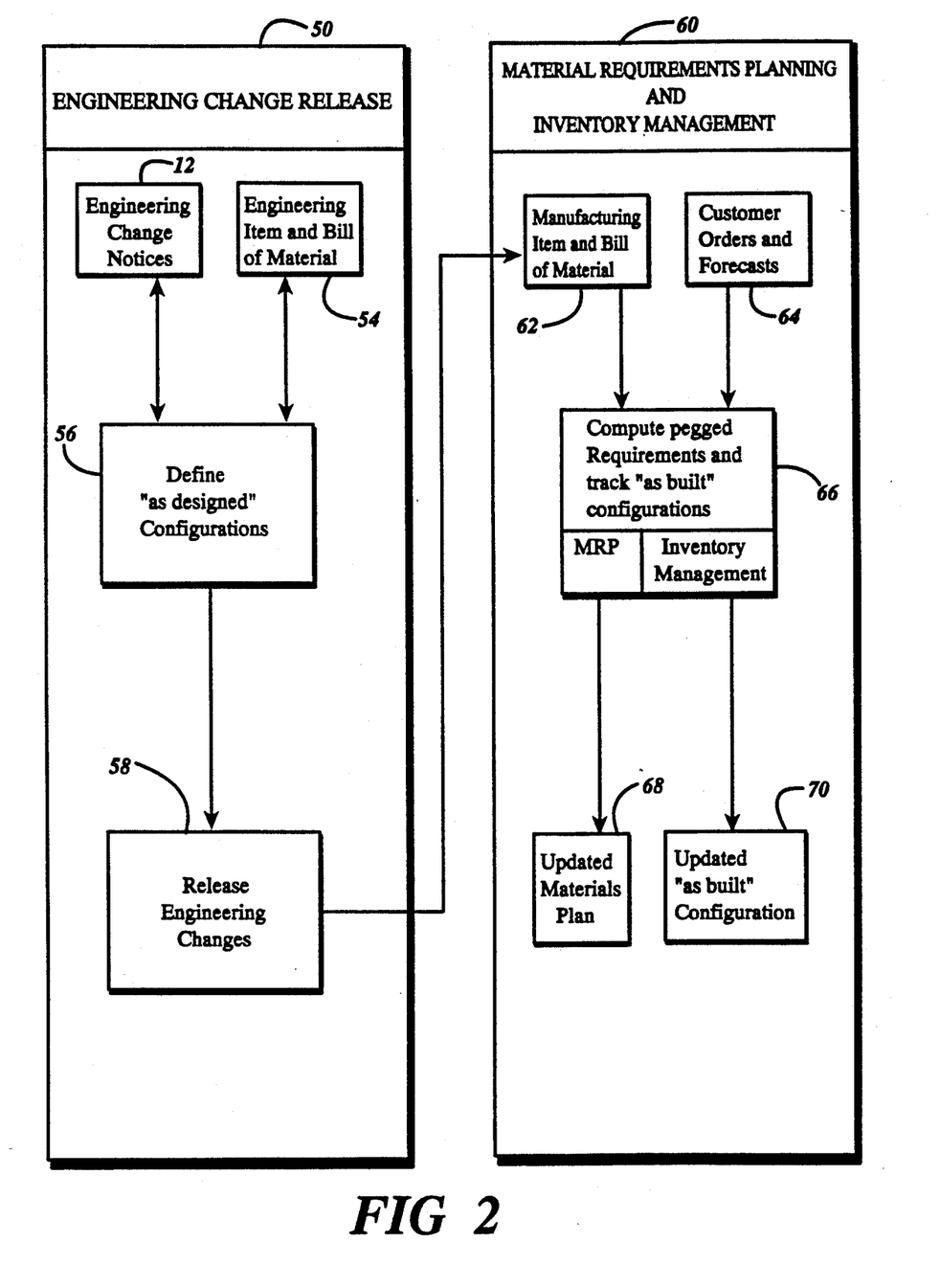
FIG. 2 illustrates the business processes that are related to product configuration definition and tracking.

A block diagram identifying the business processes related to configuration management is shown in FIG. 2. The engineering change release function 50 is integrated with the material requirements planning (MRP) and inventory management functions 60. Design engineering creates engineering change notices 12 for each new or changed product configuration. The product configurations as designed consisting of both engineering item and bill of material data 54 are defined in process 56 and stored in the database. The engineering change release process 58 releases the change information to the manufacturing function which can restructure the item and bill of material data as indicated by process 62. Based on customer orders and forecast demand 64, the material requirements planning and inventory management processes 66 prepare planned orders 68 which are then used for tracking configurations as built 70. When necessary, the configurations as built 70 can be compared with the configurations as designed 56.

The product configuration identifier assigned to each unique product configuration serves several distinct purposes. First, it serves as a view identifier to enable concurrent tracking of multiple "as designed" views of the product configurations. This invention relies on a versioning technique that allows definition of multiple views of Engineering Bills of Material 20, with a new view being created for each engineering change for an assembly. Each customer contracted configuration is defined as a new view of the Bill of Material 20 and includes all contracted modifications to a base product that are applicable to a specific configuration. Any modification to the base product in one view is not visible in another view.

Version control is further described in a co-pending, commonly assigned patent application entitled, "Method and System for Version Control of Engineering Changes," Ser. No. 602,600, filed on Oct. 24, 1990, the disclosure of which in its entirety is incorporated herein by reference.

The product configuration identifier also serves as a peg identifier for tracking the product configurations as built in the material requirements planning (MRP) and inventory management processes. The use of peg identifiers makes the product configurations as designed compatible with current implementation techniques for tracking product configurations as built. This results in an integrated system of product configuration management from design engineering through manufacturing and shipment of custom built products, and makes the differences between product configurations as designed and as built easier to detect.

Finally, the product configuration identifier enables multiple ranges of product serial numbers to be assigned to a single unique product configuration.

Figure 3:
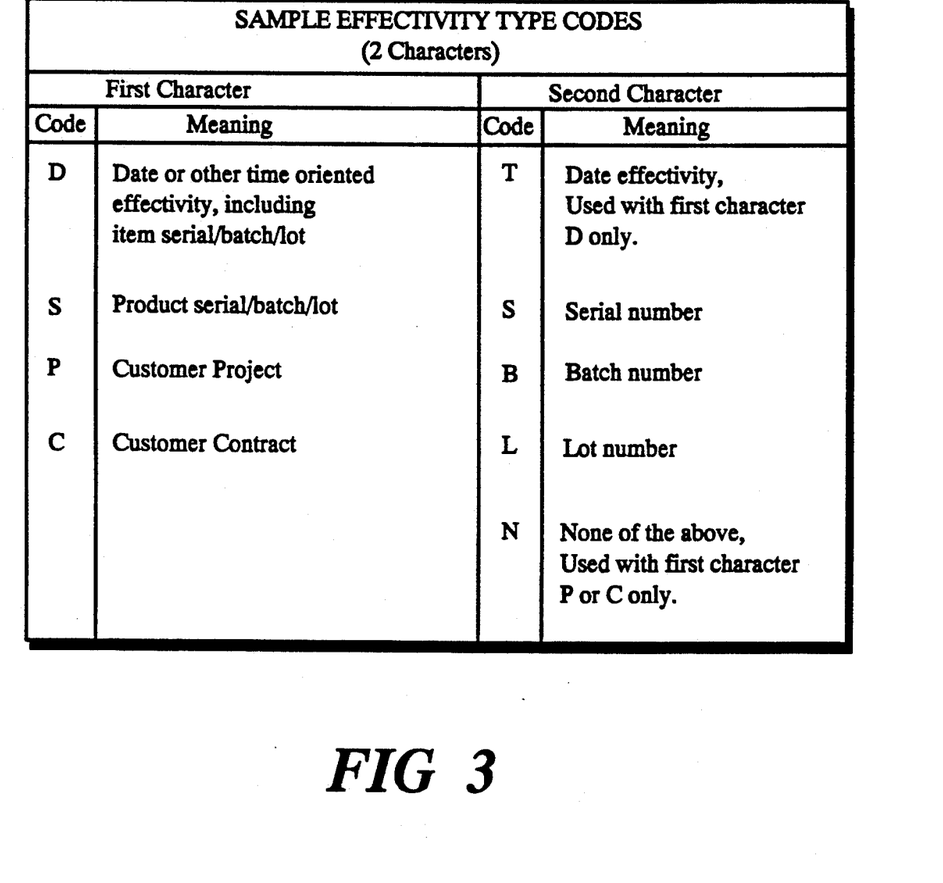
FIG. 3 illustrates a sample coding scheme for effectivity types used in the present invention.

FIG. 3 illustrates a list of effectivity type codes that can be used to identify different types of effectivities for different items within a specific view of a product configuration. The sample effectivity type code is a two character code. Time oriented effectivity can be further qualified by phase-in and phase-out planning codes which are not illustrated.

The two broad categories of effectivity are time-oriented and product-oriented. Time-oriented effectivity can be specified by start and end dates, by item serial, batch or lot numbers, and by planned phase-in/phase-out dates. Product-oriented effectivity applies to specific configurations of end products which are tied to customer projects or contracts.

Different types of effectivity can be specified for different items. For example, a product-oriented effectivity can be specified for high level assemblies and a time-oriented effectivity can be specified for lower level assemblies and components, particularly for those which are used in more than one product.

The final assembly configuration for a product can include optional sales features that can be ordered by any customer. A generic product thus consists of a standard or base product, and all possible optional sales features which can be selected by the customer. A generic product is defined to avoid a proliferation of unique products that can be built by using different combinations of the optional sales features.

A unique product is define by a specific view of the generic product. The specific view includes any optional sales features ordered by a customer and any specially designed assemblies and components to satisfy a customer contract. Any base assemblies or components that are replaced by the specially designed assemblies and components are excluded from the specific view.

Figure 4:
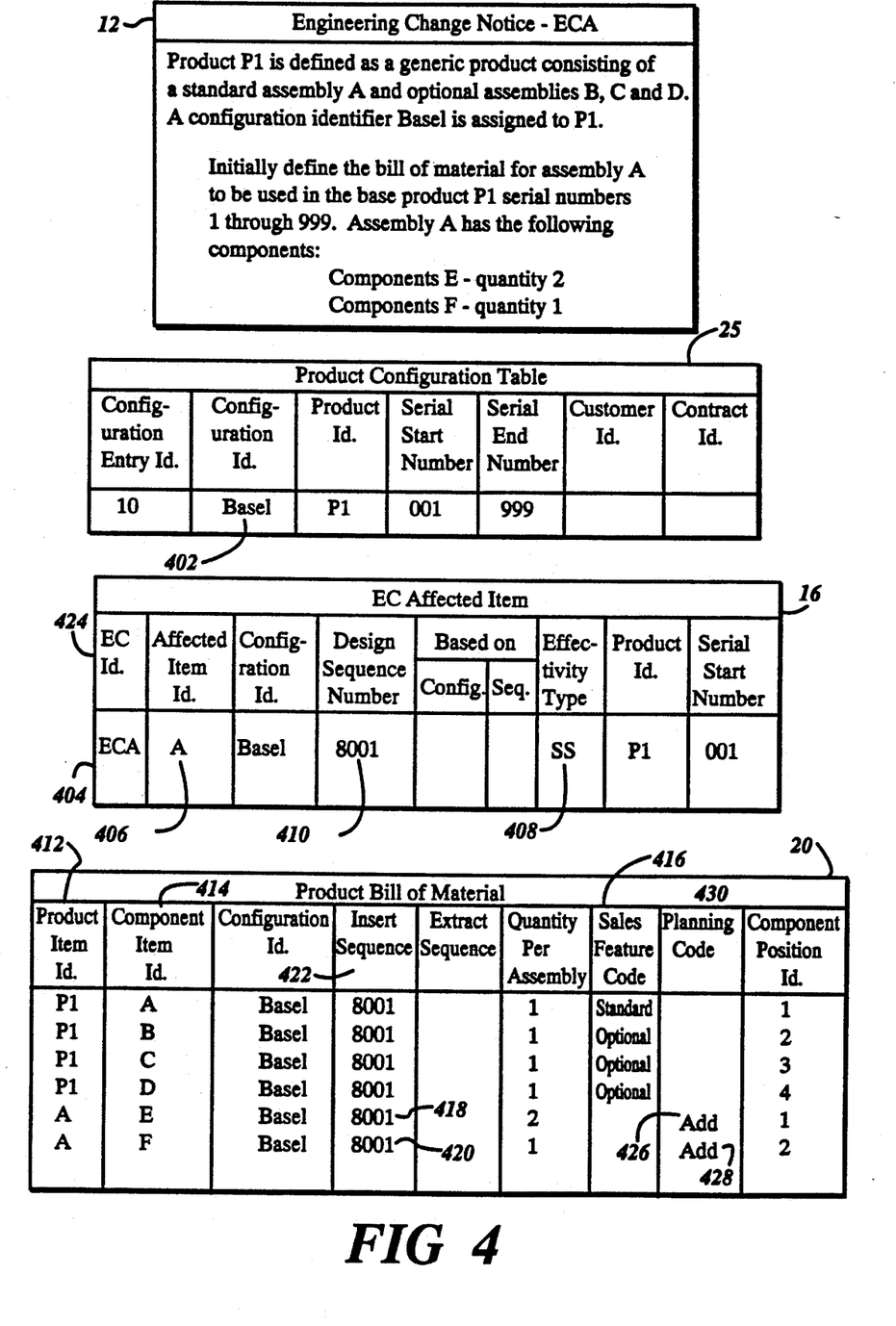
FIG. 4 illustrates an Engineering Change Notice that defines a generic product configuration of a standard assembly and several optional assemblies and initially defines the bill of material for the standard assembly.

FIG. 4 illustrates an example of defining a specific product based on a generic product. An Engineering Change Notice identified as ECA authorizes the design of a base product P1 with assigned serial numbers 001 through 999. This range is arbitrary and can be as high as needed. Product P1 is defined as a generic product with sales feature codes to identify a standard component A and optional components B, C and D. The configuration identifier "Base1" is assigned to the base product P1 as indicated by reference numeral 402 in Product Configuration table 25.

The initial entry in the EC Affected Item table 16 relates engineering change ECA 404 to assembly item A 406 with effectivity type code SS 408 (i.e., serial number effectivity) for the "Base1" configuration. A design sequence number of "8001" is assigned to this version of affected item A as indicated by reference numeral 410. Bill of Material 20 correlates the product/assembly identifier 412 with the available components identifier 414 and the sales feature code 416. This table indicates that product P1 consists of standard component A and optional components B, C and D. Bill of Material table 20 also indicates that assembly A contains components E and F in quantities two and one respectively. Bill of Material 20 contains the configuration identifier "Base1" which serves as a view identifier for concurrent tracking of multiple as designed views of the bill of material. The component items E and F are given an insert sequence number of "8001" indicated by reference numerals 418, 420 respectively corresponding to the design sequence number of 8001 for Affected Item A in EC Affected Item table 16. If the insert sequence number 422 is known, it is a simple matter to find the inserting EC identifier 424. The component planning code "Add" indicated by reference numerals 426, 428 is used to indicate that components E and F are to be added to the configuration. The component position identifiers 430 are assigned to sequence the components for display or printing.

Figure 5:
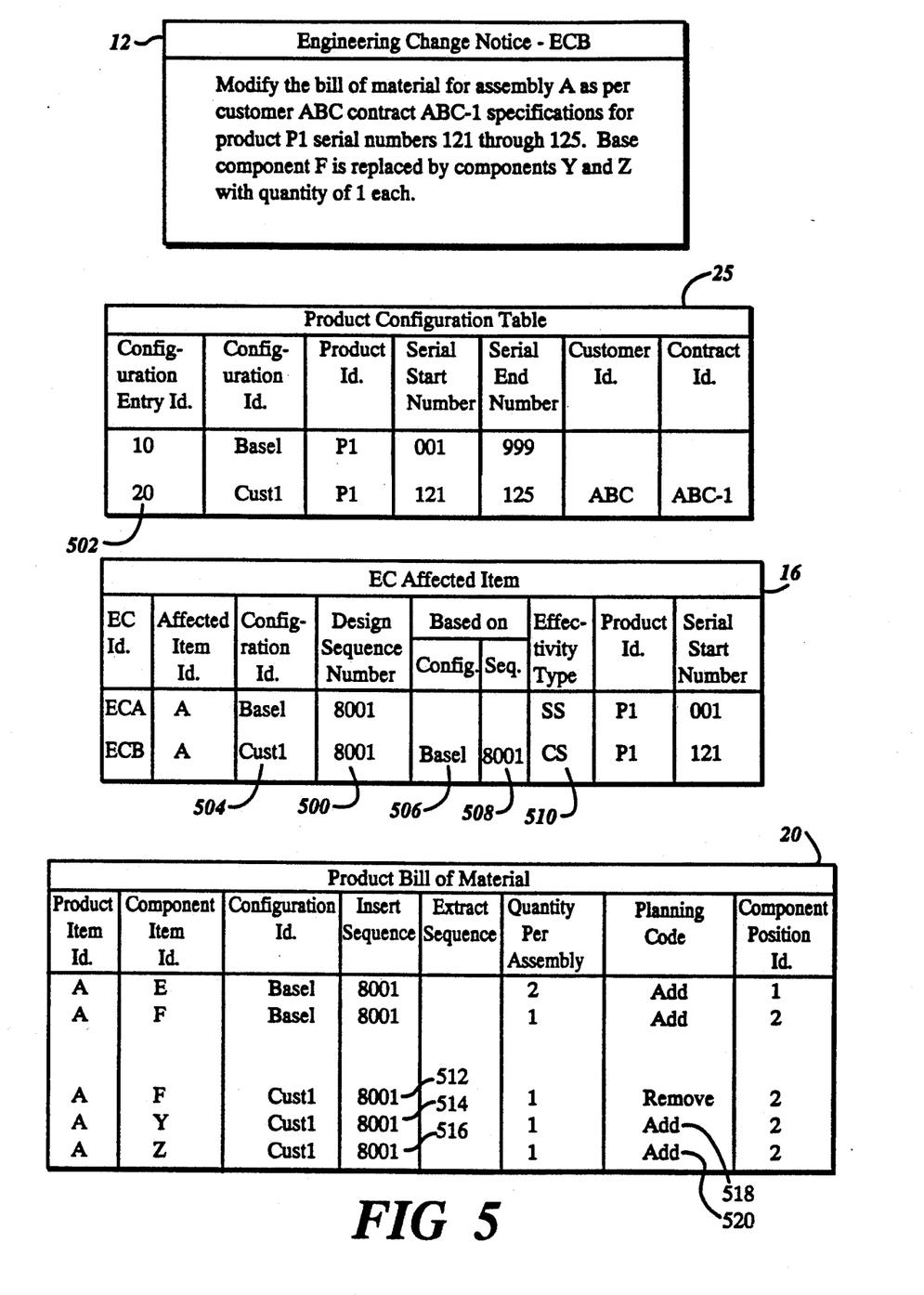
FIG. 5 illustrates an Engineering Change Notice that modifies temporarily the standard assembly in the base product in accordance with customer contract specifications.

Subsequently, as shown in FIG. 5, customer ABC orders 5 units of product P1 with the standard assembly A and no optional components. Furthermore, component F is replaced with components Y and Z. Engineering change notice ECB authorizes the design modification for product P1 and assigns serial numbers 121 through 125 corresponding to the contract ABC-1. The assigned configuration identifier is "Cust1". These changes are reflected in the row corresponding to configuration entry identifier "20" indicated by reference numeral 502 in Product Configuration table 25.

The EC Affected Item table 16 in FIG. 5 shows that a unique configuration identifier "Cust1" indicated by reference numeral 504 is assigned as a new view identifier for product P1. A design sequence number of "8001" as indicated by reference numeral 500 is assigned to this new view of affected item A resulting from engineering change ECB since the change to the base product is temporary. A reference to the base engineering change ECA is established by adding "Base 1" and "8001" to the "Based on Configuration" column and "Based on Sequence" number column. These are indicated by reference numerals 506 and 508, respectively. The effectivity type code assigned is "CS" (reference numeral 510) which indicates that effectivity is based on serial number by customer contract.

The product bill of material 20 shows two different views of the product configuration, i.e., "Base1" and "Cust1". The "component position identifier" found in the last column of product Bill of Material Table 20 is assigned to sequence the top level components or assemblies within each product for display or printing. In the "Cust1" view in the Bill of Material Table 20, components F, Y and Z are inserted with a sequence number of "8001" as indicated by reference numerals 512, 514, and 516, respectively. Component planning code "Remove" is assigned to component F since it is to be temporarily removed from the base configuration for this view of assembly A. Component planning code "Add" is assigned to components Y and Z (reference numerals 518, 520) to indicate that they are to be added to the configuration. Both components Y and Z are assigned a component position identifier of "2" which is the same component position identifier as that for component F. This indicates that components Y and Z temporarily replace component F. This implementation thus provides traceability of temporary changes made to the base product.

Figure 6:
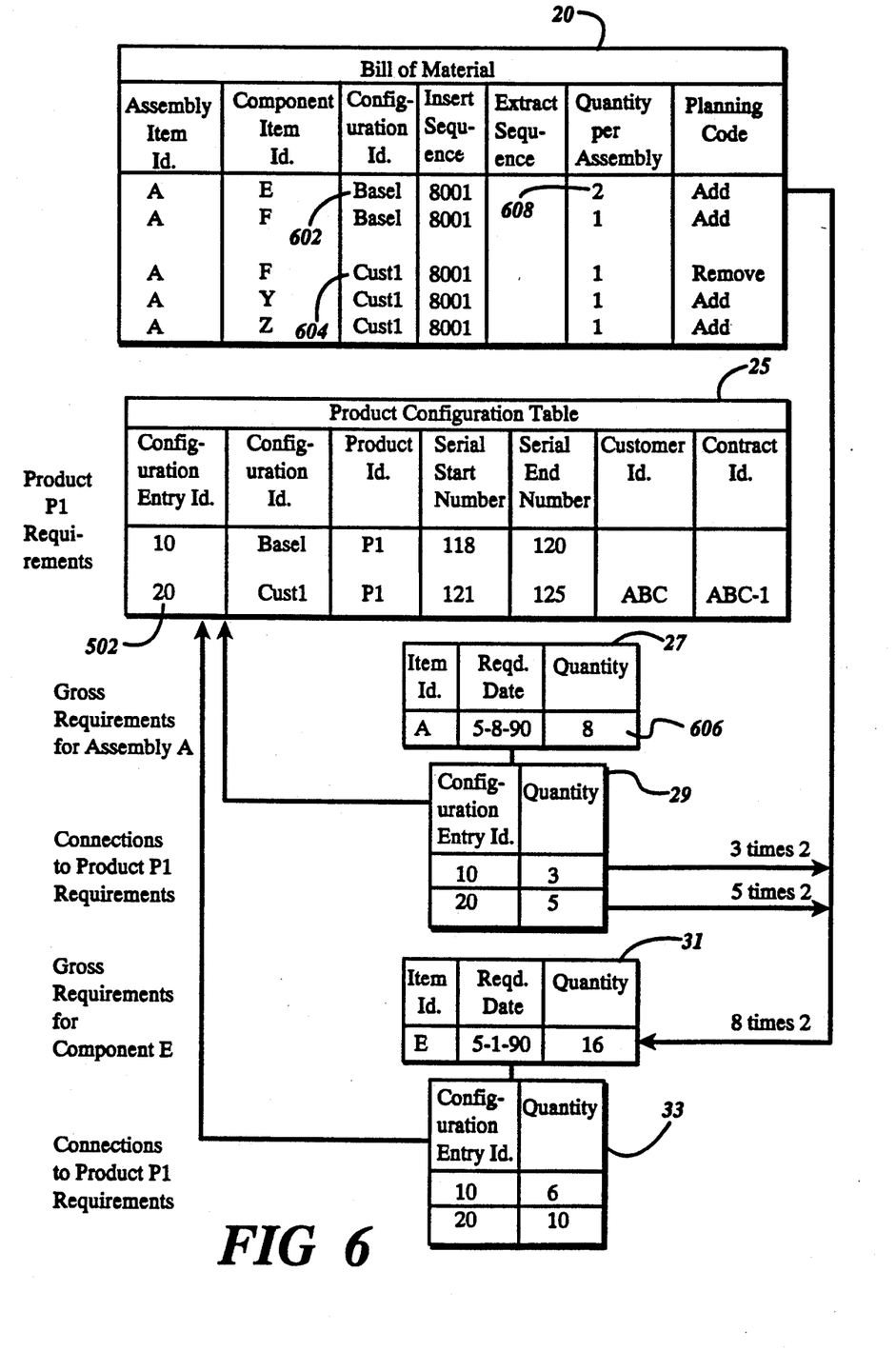
FIG. 6 illustrates the technique of pegging detail component requirements to customer contracts in accordance with the present invention.

FIG. 6 illustrates the technique of pegging detail component requirements to serially numbered products. The configuration entry identifier in Product Configuration table 25 serves as a peg identifier for tracking the product configurations as built by the material requirements planning and inventory management functions. It makes the definition of product configurations as designed compatible with the implementation of product configurations as built resulting in an integrated system of product configuration management. This makes it straight forward to detect the differences between product configurations as designed and as built.

Referring to the Product Configuration table 25 and Bill of Material 20 of FIG. 6, it can be observed that assembly A for product P1, serial numbers 118-120, uses components E and F. For product P1, serial numbers 121-125, component F is replaced by components Y and Z. Bill of Material 20 contains references to the product configurations involved indicated by 602, 604. For example, component E is used for both "Base1" and "Cust1" configurations. The planned order requirement for component E is computed by extending the planned orders for assembly A (reference numeral 606) and the quantity of E found in the bill of material for assembly A (reference numeral 608). Detailed connections between component E requirements and product P1 serial numbers are established by pointing to the appropriate entries in Product Configuration table 25. Gross requirements for assembly A are indicated by table 27. The requirements for assembly A in product P1 based on each configuration are reflected in table 29. By relating Bill of Material 20 to assembly A requirements 29 for product P1, the gross requirements for component E are derived as shown in table 31. Finally, the requirements for component E in assembly A of product P1 based on the separate configurations are indicated in table 33.

Any subsequent reassignment of serial numbers, including noncontiguous ranges of serial numbers for the "Cust1" configuration will have no effect on the bill of material.

Figure 7:
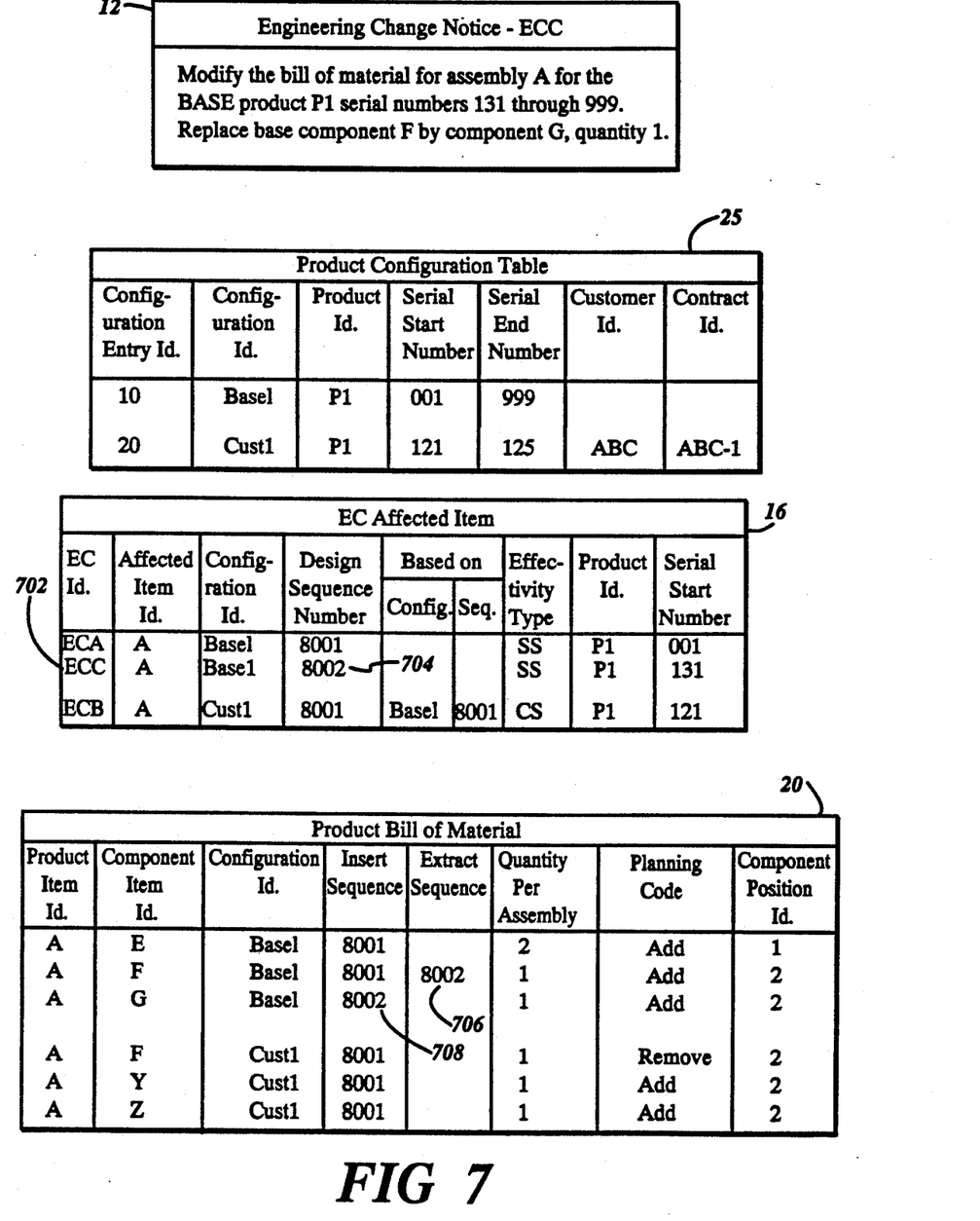
FIG. 7 illustrates an Engineering Change Notice that modifies permanently the standard assembly in the base product.

In FIG. 7, engineering change notice for engineering change ECC modifies the bill of material for base product P1 having serial numbers 131 through 999. Base component F is replaced permanently by component G. This is a time oriented effectivity in which engineering change ECC 702 supersedes engineering change ECA for the same configuration. The ECC version of assembly A for the "Base1" configuration is assigned a design sequence number of "8002" as indicated by reference numeral 704 in EC Affected Item table 16. Component F is extracted from the "Base1" configuration by the design sequence number "8002" shown by the extract sequence number entry 706 for component F in bill of material table 20. Component G is inserted into the "Base1" configuration by the same design sequence number shown by the insert sequence number entry for component G (reference numeral 708) in Bill of Material table 20.

Notice that the "Base1" component E remains unextracted by engineering change ECC and therefore is applicable to design sequence number 8002. This versioning of the "Base1" configuration is independent of the earlier removal of component F for the "Cust1" configuration corresponding to engineering change ECB. This example illustrates the capability provided by this invention of assigning product serial number effectivity to the base product configuration, keeping the base configuration distinct from all customer specified changes, and maintaining multiple time oriented versions of the base product to support continued application of engineering changes to the base product.

Figure 8:
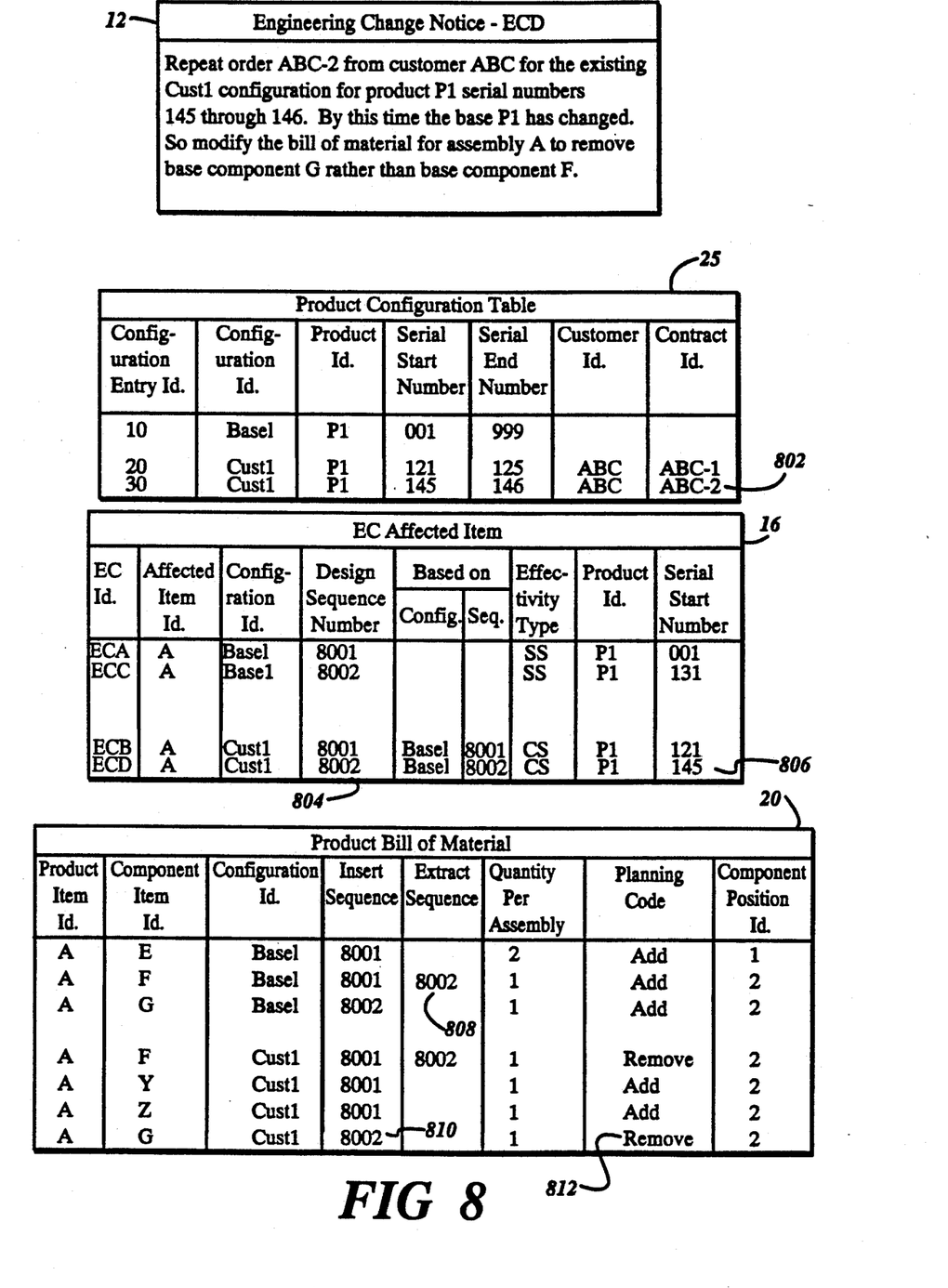
FIG. 8 illustrates an Engineering Change Notice that temporarily modifies the standard assembly in the revised base product in accordance with customer contract specifications.

In FIG. 8, engineering change ECD repeats an order for the existing "Cust1" configuration for customer ABC for product P1 serial numbers 145-146. The order or contract identifier is ABC-2 as shown by reference numeral 802 in Product Configuration table 25. EC Affected Item table 16 is updated by engineering change ECD to reflect that the "Cust1" view is now based on product configuration "Base1" having associated design sequence number "8002" as indicated by reference numeral 804. The product P1 effective serial number is identified as 145 as indicated by reference numeral 806. The "Cust1" view of assembly A still includes components, E, Y and Z. Components Y and Z were substituted for component F in the "Cust1" view of assembly A in product P1 effected by engineering change ECB. Since intervening engineering change ECC represents a permanent change to the base product resulting in replacement of component F by component G, the bill of material table 20 has to be updated to reflect the changes to assembly A in the base product in the "Cust1" view. Thus the Bill of Material 20 for assembly A ("Cust1" view) needs to be modified to temporarily remove base component G rather that base component F which has been permanently replaced in the base product. This represents a time-oriented effectivity wherein engineering change ECD for the "Cust1" configuration supersedes engineering change ECB for the same configuration. The engineering change ECD version of assembly A for the "Cust1" configuration is assigned a design sequence "8002", indicated by reference number 804. Component F in the "Cust1" configuration is extracted by design sequence number 8002 (reference numeral 808) and component G is inserted in the "Cust1" configuration by the same design sequence number. However, since component G is temporarily removed from product P1 by the "Cust1" configuration, the corresponding planning code for component G is "Remove" (reference numeral 812). Extracting component F made it inapplicable at the engineering change ECD level. Components Y and Z remain unextracted from the "Cust1" configuration; and, therefore, they are applicable to the design sequence number "8002" corresponding to engineering change ECD. The system and method of this invention thus provides the ability to track both permanent and temporary changes to the base product and generate a tailored bill of material for product manufacture that conforms to customer specifications.

While the invention has been particularly shown and described with respect to the particular embodiment thereof, it will be understood by those skilled in the act that various change in form and details may be made therein without departing from the spirit and scope of the invention.

Having thus described our invention, what we claim and desire to secure by letters patent is as follows:

1. In a data processing system having a plurality of communicating nodes, at least one of said communicating nodes capable of communicating engineering change requests reflecting changes to previously stored plurality of product configurations and at least one of said nodes capable of receiving information on at least one of said product configurations, and at least one central node capable of receiving from and sending to said plurality of communicating nodes, a method for enabling storing said information with previously stored product configurations in a manner enabling defining and tracking said changed stored product configurations, said method comprising:

constructing a base product view at said central node, said base product view having a plurality of standard component features and a plurality of optional component features, each of said base product views defining one of a plurality of product configurations, and storing said base product view in a bill of material;

assigning a first product configuration identifier to said base product view and tagging each of said plurality of standard and optional component features stored in said bill of material with said first product configuration identifier;

receiving at said central node an engineering change request from a first communication node, said engineering change request associated with a specific customer product configuration, and generating an engineering change notice associated with said engineering change request, that modifies said base product view, and assigning a second product configuration identifier to said specific customer product configuration;

constructing a customer product view wherein new components are added and replaced components are removed from said base product view in accordance with said engineering change notice and tagging said new and replaced components with said second product configuration identifier;

tracking said customer product view by means of said second product configuration identifier and said first product configuration identifier; and generating a tailored bill of material based on said tracked customer product view;

transmitting to a second communicating node said tailored bill of materials.

2. The method of claim 1 including the step of generating a product configuration table for correlating each product configuration identifier with a contract identifier and a range of serial numbers.

3. The method of claim 2 wherein each entry in said product configuration table contains a configuration entry identifier, a product configuration identifier, a product identifier, serial start and end numbers, a customer identifier, and a contract identifier.

4. The method of claim 1 including the step of generating an engineering change affected item table for correlating an engineering change identifier with each component affected by the engineering change and with the second product configuration identifier and assigning a design sequence number to the engineering change notice that corresponds to said engineering change identifier.

5. The method of claim 4 wherein each entry in said engineering change affected item table contains an engineering change identifier, an affected component identifier, a product configuration identifier, a design sequence number, a reference product configuration identifier and corresponding sequence number, an effectivity type code, a product identifier, and a serial start number.

6. The method of claim 1 wherein said tailored bill of materials is comprised of a bill of material table and said step of constructing a customer product view includes generating a plurality of entries in said bill of material table for correlating each component removed from, and each component added to, the base product view with the second product configuration identifier and tagging each entry with a corresponding component position identifier.

7. The method of claim 6 wherein each entry in said bill of material that represents part of the customer product view contains the second product identifier, an insert sequence number, and a component position identifier.

8. A system for the definition and tracking of complex product configuration designs in a computer-based information processing system, said system comprising:

a plurality of communicating nodes, at least one of said communicating nodes capable of communicating engineering change requests reflecting changes to previously stored plurality of product configurations and at least one of said nodes capable of receiving information on at least one of said product configurations;

storage means for storing a plurality of files including an engineering change notices file, a master item, file, an engineering change affected item file, an engineering bill of material, and a product configuration table;

means for receiving from a first communication node information on a product configuration and means for constructing a base product view, said base product view including a plurality of standard component features and a plurality of optional component features, each of said base product views defining one of a plurality of product configurations, and storing said base product view in said bill of material on said non-volatile data storage device;

means for assigning a first product configuration identifier to said base product view and tagging each of said plurality of standard and optional component features stored in said bill of material with said first product configuration identifier;

means for receiving from one of said communication nodes an engineering change request, said engineering change request associated with a specific customer product configuration, means of generating an engineering change notice associated with said engineering change request, that modifies said base product view, and assigning a second product configuration identifier to said specific customer product configuration;

means of constructing a customer product view wherein new components are added and replaced components are removed from said base product view in accordance with said engineering change notice and tagging said new and replaced components with said second product configuration identifier;

means for tracking said customer product view by means of said second product configuration identifier and said first product configuration identifier;

means for generating a tailored bill of material based on said tracked customer product view; and means for transmitting to one of said plurality of communicating node said tailored bill of materials.

9. The system of claim 8 wherein said means for constructing a customer product view includes means for correlating each item affected by an engineering change based on a customer product specification with corresponding component entries in said customer product view of the bill of material, said means for correlating resulting in a plurality of correlated items and said means for tracking said customer product view uses said plurality of correlated items in said tracking.

10. The system of claim 9 wherein said means for constructing a customer product view includes means for determining if each item and the corresponding components affected by an engineering change represent permanent changes to the bill of material reflecting a change to a base product view or temporary changes to the bill of material reflecting said customer product view, each of said items and components having an identification as temporary or permanent and said means for tracking said customer product view uses said identification in said tracking.

* * * * *